(12) United States Patent
Crombez

(10) Patent No.: US 6,291,960 B1
(45) Date of Patent: Sep. 18, 2001

(54) PULSE WIDTH MODULATED MOTOR CONTROL SYSTEM AND METHOD FOR REDUCING NOISE VIBRATION AND HARSHNESS

(75) Inventor: Dale Scott Crombez, Livonia, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/533,296

(22) Filed: Mar. 22, 2000

(51) Int. Cl.$^7$ ................................................. G05B 11/28
(52) U.S. Cl. ........................ 318/599; 318/478; 318/456; 318/811
(58) Field of Search .................................. 318/811, 478, 318/456, 599, 481

(56) References Cited

U.S. PATENT DOCUMENTS

| | | | |
|---|---|---|---|
| 4,958,636 | 9/1990 | Blandino et al. | 128/630 |
| 5,110,152 * | 5/1992 | Jones | 280/707 |
| 5,477,833 | 12/1995 | Leighton | 123/497 |
| 5,900,704 * | 5/1999 | Henninger et al. | 318/268 |
| 5,986,426 | 11/1999 | Rowan | 318/599 |
| 6,047,557 * | 5/2000 | Pham et al. | 62/228.5 |

* cited by examiner

Primary Examiner—Robert E. Nappi
Assistant Examiner—Rita Leykin
(74) Attorney, Agent, or Firm—Mark S. Sparschu

(57) ABSTRACT

An apparatus for reducing motor noise in a motor driven system (12) has a sensor (22) coupled to the system that generates an electrical signal indicative of a system operating parameter. A controller (24) is coupled to the motor (14) and the sensor (22). The controller (24) drives the motor (14) with a pulse width modulated signal having a variable duty cycle. The controller (24) monitors the electrical signal and varies the pulse width modulated signal from a low duty cycle corresponding to a low noise operation of the motor (14) to a higher duty cycle in response to an increased demand as indicated by the sensor.

17 Claims, 3 Drawing Sheets

PULSE WIDTH MODULATED MOTOR CONTROL SYSTEM AND METHOD FOR REDUCING NOISE VIBRATION AND HARSHNESS

TECHNICAL FIELD

The present invention relates generally to the operation of electric motors, and more particularly, to a method and system of operating an electric motor to reduce noise vibration and harshness.

BACKGROUND

Electric motors are used for various purposes in automotive vehicles. Commonly, pulse width modulation (PWM) is used to drive the motor. A number of trade offs must be considered when determining the duty cycle of the pulse width modulation signal. System performance and NVH goals are typically at competing ends of the trade off dynamic. For example, in order to meet NVH goals, the duty cycle of the pulse width modulated signal should be low. However, the low duty cycle requires the motor to run longer and may potentially compromise the system performance. Oftentimes minimum duty cycle levels are set so that minimum performance criteria of a given system may be met. The minimum duty cycles do not allow reduced noise vibration and harshness (NVH).

It would therefore be desirable to provide a motor-driven system that is capable of operating at a reduced noise vibration and harshness level while not compromising overall system performance.

SUMMARY OF THE INVENTION

It is therefore one object of the invention to provide a pulse width modulated motor control system that can vary the pulse width modulation in response to system performance to reduce noise vibration and harshness of the system.

In one aspect of the invention, an apparatus for reducing motor noise in a motor driven system has a sensor coupled to the system that generates an electrical signal indicative of a system operating parameter. A controller is coupled to the motor and the sensor. The controller drives the motor with a pulse width modulated signal having a variable duty cycle. The controller monitors the electrical signal and varies the pulse width modulated signal from a low duty cycle corresponding to a low noise operation of the motor to a higher duty cycle in response to an increased demand as indicated by the sensor.

In a further aspect of the invention, a method for reducing in a motor-driven system comprises the steps of:

applying a primary pulse width modulated signal having a first duty cycle to the motor;

monitoring a system parameter; and applying a second pulse width modulated signal having a second duty cycle greater than said first duty cycle to said motor in response to system parameter.

One advantage of the invention is that the motor will operate at a reduced noise level for much of its operation while not under a substantial load. The duty cycle is increased when demand on the system increases.

Other objects and features of the present invention will become apparent when viewed in light of the detailed description of the preferred embodiment when taken in conjunction with the attached drawings and appended claims.

DESCRIPTION OF THE PREFERRED EMBODIMENTS

The following figures represent two embodiments of the invention with respect to an automotive system using a motor-driven pump. However, those skilled in the art would recognize that the teachings of the present invention may be applied to other systems including non-automotive systems.

Figure 1:
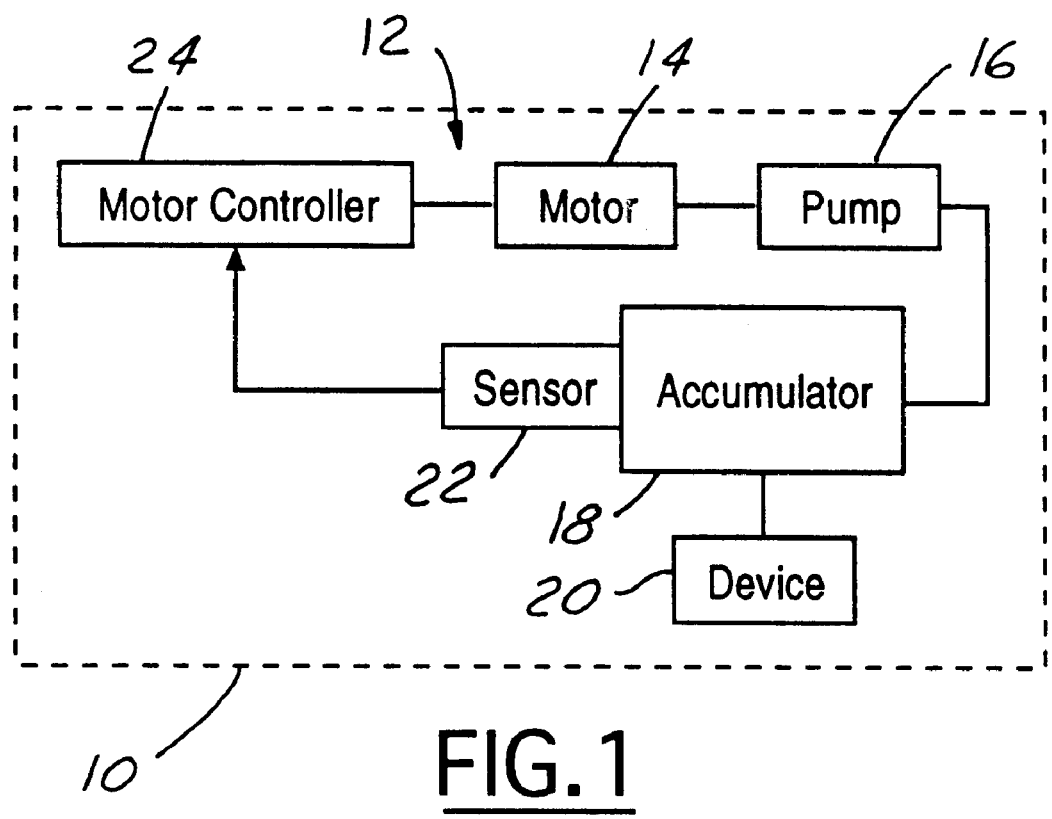
FIG. 1 is a system block diagrammatic view of an automotive vehicle having a reduced noise motor motor-driven system according to the present invention.

Referring now to FIG. 1, an automotive vehicle 10 having an electric motor-driven system 12. The electric motor-driven system 12 has an electric motor 14 coupled to a pump 16. The speed of the motor 14 controls the pressure output of pump 16. Pump 16 is coupled to an accumulator 18. Accumulator 18 stores fluidic pressure for the remainder of the system including device 20.

A sensor 22 is coupled to accumulator 18. Sensor 22 is coupled to motor controller 24. Sensor 22 may, for example, be a pressure sensor that generates an electrical signal indicative of the pressure within accumulator 18. Sensor 22 is electrically coupled to motor controller 24. Motor controller 24 is used to control the operation of motor 14. Motor controller 24 as will be further described below is capable of driving motor with a pulse width modulated signal with a variable duty cycle. As will be further described below, motor controller 24 varies the duty cycle in response to the electrical signal from sensor 22. In other systems not having a pump and accumulator, sensor 22 provides an electrical signal indicative of a system parameter. In response to the system parameter, the motor controller 24 controls the operation of motor 14 by varying the duty cycle of the pulse width modulated signal.

Generally, in the operation of the present example, accumulator 18 may be an accumulator of a brake system of the vehicle. The device 20 may be the individual brake actuators of the brake system. Accumulator 18 stores system pressure. As the pressure in the accumulator is reduced, sensor 22 indicates to motor controller the presence of a reduced pressure and therefore motor 14 is operated at a low duty cycle having reduced noise vibration and harshness characteristics. Motor 14 drives pump 16 to provide additional pressure to accumulator 18. If, however, demand on the accumulator is great, sensor 22 will indicate a substantial pressure loss to motor controller 24. Thus, the duty cycle of the pulse width modulated signal driving motor 14 may then be increased.

Figure 2:
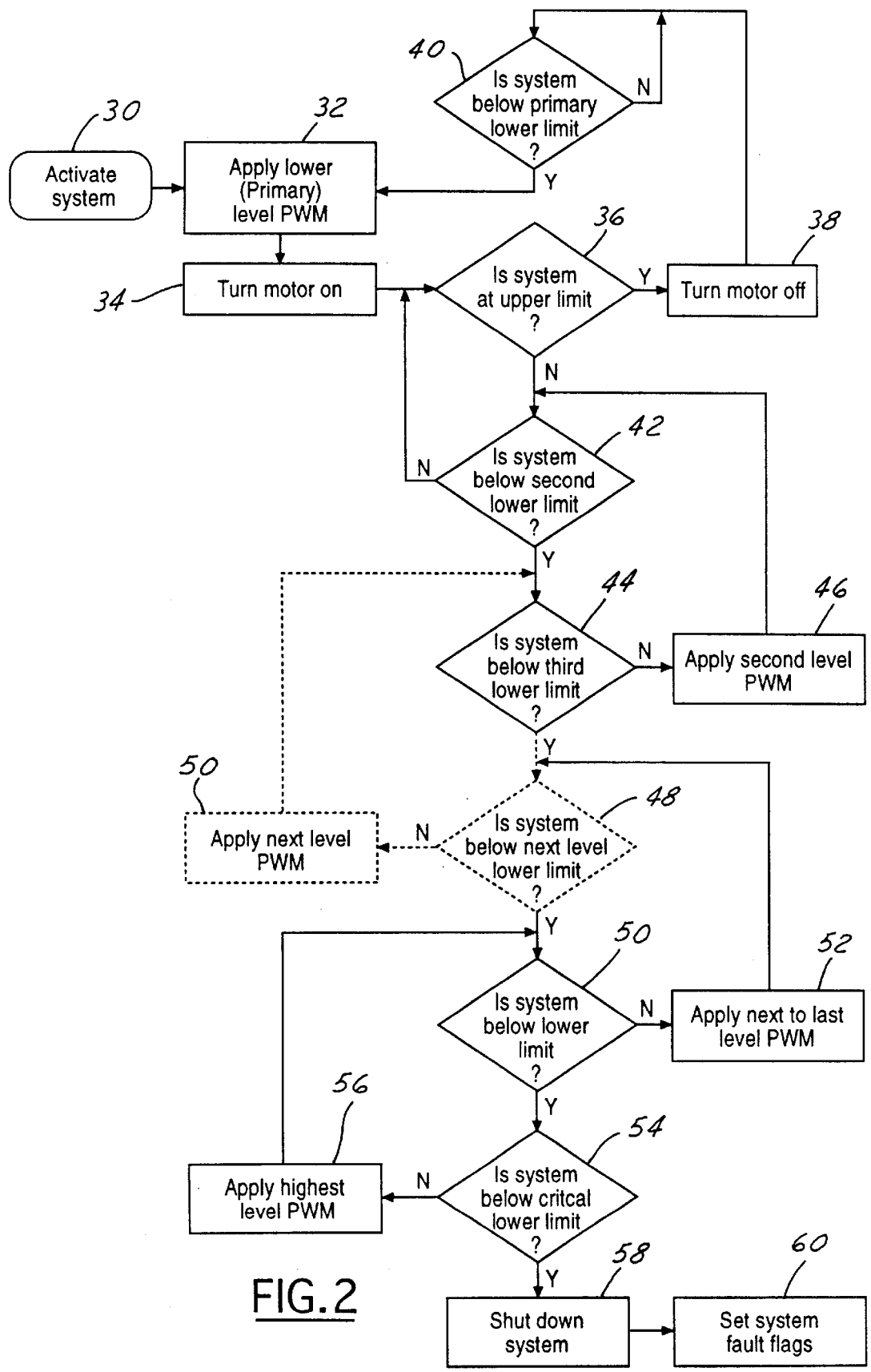
FIG. 2 is a block diagrammatic view of one embodiment of the present invention.

Referring now to FIG. 2, a flow chart illustrating the method for controlling a system to reduce NVH is illustrated. In this example, various limit levels that correspond to levels of pulse width modulating signals are determined prior to operation. In the following example, the upper limit, second lower limit, third lower limit, next lower limit, and critical lower limit are all limits that correspond to the accumulator pressure. The upper limit corresponds to the highest accumulator pressure and the subsequent limits are lower levels. Likewise, the levels of pulse width modulation increase down the flow chart to correspond to the increasing need for re-pressurization of the accumulator.

The method begins in step 30 where the system is activated. In step 32 a lower level or primary pulse width modulated signal is generated which turns the motor on in step 34. In step 36, the pressure of the accumulator is monitored to determine if the accumulator is fully pressurized. If the system is at its upper pressure limit, then step 38 is executed which turns the motor off. From step 38, step 40 is executed which determines whether the system is below the primary lower limit. If the system is not below the primary lower limit, the system does not continue and re-execute step 40 until the system is below the primary lower limit. If the system falls below the primary lower limit, steps 32 through 36 are executed. In step 36, if the system is not at its upper limit, then step 42 is executed. In step 42, the system pressure is checked to determine whether it is below a second lower limit. If the system is not below a second lower limit, then step 36 is re-executed. In step 42, if the system is below a second lower limit, step 44 is executed to determine whether the system is below a third lower limit. If the system is not below a third lower limit, i.e., between the second lower limit and third lower limit, step 46 is executed that applies a second level pulse width modulated signal having a higher duty cycle than the primary level pulse width modulated signal. After step 46, step 42 is again re-executed.

In step 44, if the system is below a third lower limit, step 48 is executed to determine whether the system is below the next lower limit. If the system is between the third lower limit and the next lower limit, step 50 is executed which applies the next level pulse width modulated signal which is higher than the second level pulse width modulated signal. After step 50, step 44 is again executed.

In step 48, if the system is below the next level lower limit, step 50 is executed which determines whether the system is below the lower limit. If the system is not below the lower limit, i.e., between the next level lower limit and the lower limit, the next to last level pulse width modulated signal is applied in step 52. The next to last level pulse width modulated signal has a duty cycle greater than the next level pulse width modulated signal. After step 52, step 48 is again executed. In step 50, if the system is below the lower limit step 54 is executed which determines whether the system is below a critical lower limit. If the system is below a critical lower limit then the highest level pulse width modulated signal is applied in step 56. The highest level pulse width modulated signal has a duty cycle greater than the next to last level pulse width modulated signal from step 52. After step 56, step 50 is again executed. In step 54, if the system is below a critical lower limit, then the system is shut down in step 58 and system fault flags are set in step 60.

As is illustrated by the above method, if the system pressure begins to fall and the system is unable to keep up for short periods of time, an increasing pulse width modulated signal may be applied. After the system begins to catch up, the system can work its way back up the steps so that a decreasing pulse width modulated signal can be applied as the pressure increases.

Figure 3:
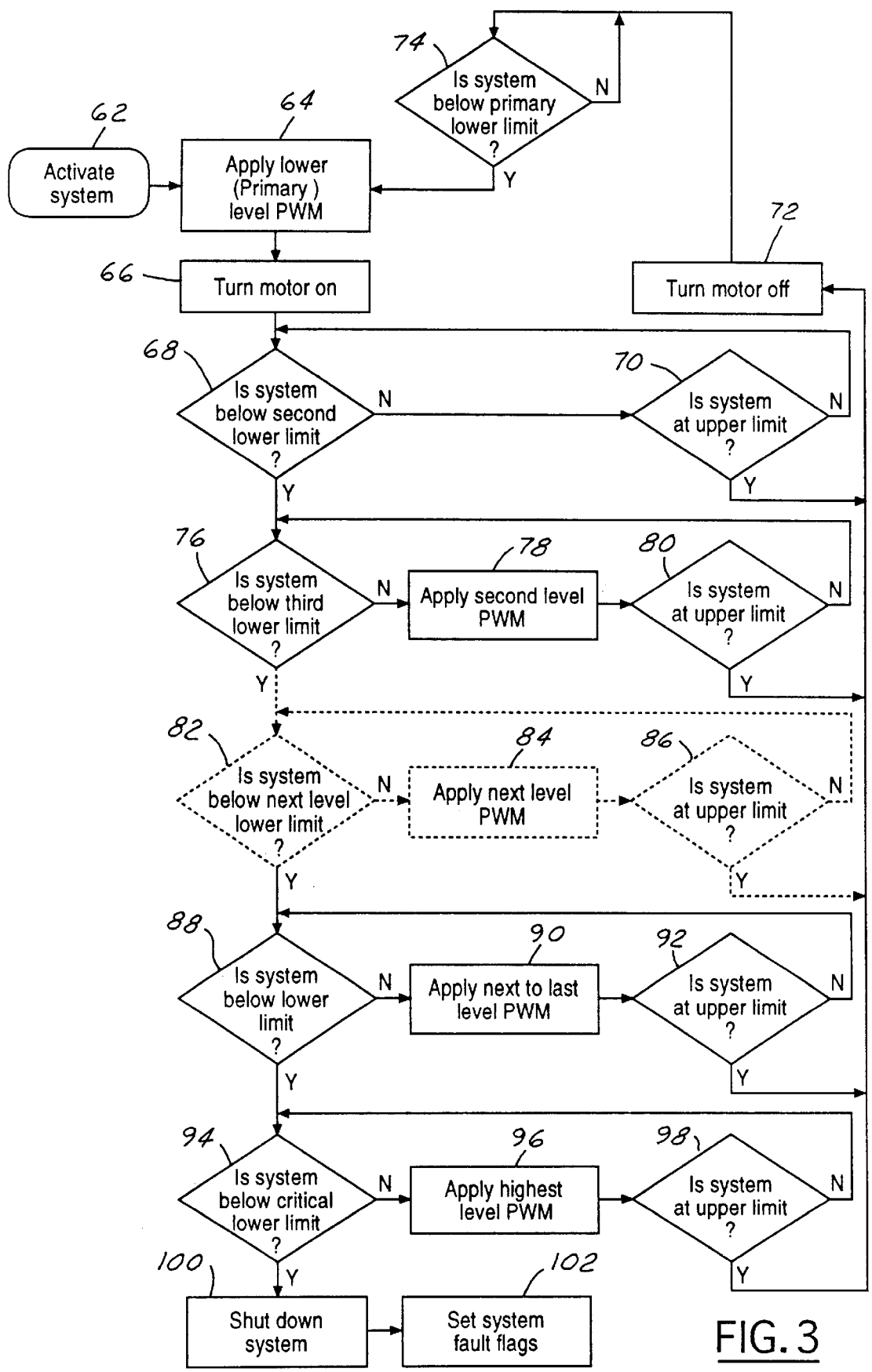
FIG. 3 is a block diagrammatic view of an alternative embodiment of the present invention.

Referring now to FIG. 3, a similar process to that shown in FIG. 2 is illustrated. In this process, limits and pulse width modulation levels are predetermined. If the system falls below the next limit, the next level pulse width modulation signal is applied until the system reaches its upper limit for each of the levels.

The system begins in step 62 where the system is activated. In step 64, applies a lower (primary level) pulse width modulated signal having a predetermined duty cycle. The predetermined lower level duty cycle corresponds to the lower desirable duty cycle to have a reduced noise vibration harshness effect. In step 64, the determined pulse width modulated signal is applied to a motor which turns the motor on in step 66. In step 68, the system pressure is measured to determine whether it is below a second lower limit. If the system is not below a second lower limit in step 68, step 70 is executed which determines whether the system is at its upper limit. If the system is not at its upper limit, step 68 is re-executed. In step 70, if the system is at its upper limit then step 72 is applied which turns the motor off. After step 72, step 74 is executed to determine whether the system is below the primary lower limit. If the pressure is not below the primary lower limit then step 74 is re-executed until the system falls below the primary lower limit. When the system falls below the primary lower limit, steps 64, 66, and 68 are again executed.

In step 68, if the system is below the second lower limit, step 76 is executed. In step 76, if the system is not below the third lower limit then step 78 is executed. In step 78 a second level pulse width modulated signal having a higher duty cycle than the primary level pulse width modulated signal is applied to the motor. In step 80, the system pressure determines whether it is at its upper limit. If the system is not at its upper limit, step 76 is executed again. If the system is at its upper limit, then steps 72 and 74 are executed. Thus, as long as the system pressure does not continue to decrease, steps 76 through 78 are executed until the system pressure arises to the upper limit.

In step 76, if the system falls below the third lower limit, step 82 is executed. In step 82, if the system is not below the next lower level limit, step 84 is executed. In step 84, the next level pulse width modulated signal having a duty cycle greater than the second level pulse width modulated signal of step 78 is applied to the motor. After step 84, step 86 is executed in which it is determined whether the system has reached the upper limit. If the system has reached the upper limit in step 86, steps 72 and 74 are executed in which the motor is turned off. If the system has not reached its upper limit in step 86, step 82 is again executed.

In step 82, if the system has fallen below the next level lower limit then step 88 is executed. In step 88, if the system is not below the lower limit then step 90 is applied. In step 90, if a next to last level pulse width modulated signal having a duty cycle greater than the next level pulse width modulated signal of step 84 is applied to the motor. While the next to last level pulse width modulated signal is applied to the motor, step 92 determines whether the system has reached its upper limit. If the system has reached its upper limit, then the motor is turned off in step 72 and step 74 is executed. If the system has not reached its upper limit, then step 88 is again executed.

In step 88, if the system has fallen below the lower limit, then step 94 is executed. In step 94 it is determined whether the system has fallen below a critical lower limit. If the system has not fallen the critical lower limit, then step 96 is executed. In step 96, the highest level pulse width modulated signal is applied to the motor. The highest level pulse width modulated signal has a duty cycle greater than the next to last level pulse width modulated signal. While the highest level pulse width modulated signal is applied to the motor, step 98 is executed to determine whether the system is at an upper limit. If the system is at an upper limit, step 72 is executed. If the system is not at its upper limit, then step 94 is again executed.

In step 94, if the system falls below a critical lower limit then step 100 shuts down the system and step 102 applies a system fault flag to the system.

As will be evident to those skilled in the art, the system may be configured in various manners depending on what type of system and what system parameters are monitored.

For example, the system may easily be modified to determine whether a system parameter has been surpassed to apply the next level pulse width modulated signal.

While particular embodiments of the invention have been shown and described, numerous variations alternate embodiments will occur to those skilled in the art. Accordingly, it is intended that the invention be limited only in terms of the appended claims.

What is claimed is:

1. A method for reducing noise in a motor driven system comprising the steps of:

applying a primary pulse width modulated signal having a first duty cycle to the motor;

monitoring a system parameter;

applying a second pulse width modulated signal having a second duty cycle greater than said first duty cycle to said motor in response to system parameter; and applying a third pulse width modulated signal having a third duty cycle greater than said second duty cycle to said motor in response to system parameter.

2. A method as recited in claim 1 further comprising the steps of monitoring the system parameter; and applying a fourth pulse width modulated signal having a fourth duty cycle greater than said third duty cycle to said motor in response to system parameter.

3. A method for reducing noise in a motor driven system comprising the steps of:

applying a primary pulse width modulated signal having a first duty cycle to the motor;

monitoring a system parameter;

applying a second pulse width modulated signal having a second duty cycle greater than said first duty cycle to said motor in response to system parameter; and applying a highest level pulse width modulated signal having a highest duty cycle greater than said second duty cycle to said motor in response to a critical limit system parameter.

4. A method as recited in claim 3 further comprising the step of shutting down the system if the system parameter is below a critical limit.

5. A method as recited in claim 3 further comprising the step of setting a system flag if the system parameter is below a critical limit.

6. A method as recited in claim 3 wherein said system parameter is pressure.

7. A method of reducing noise in a pressurized system having a motor driving a pump and an accumulator fluidically coupled to the pump, said method comprising the steps of:

applying a primary pulse width modulated signal hating a first duty cycle to the motor;

monitoring a pressure in the accumulator;

when said pressure in said accumulator decreases to a first predetermined pressure, applying a second pulse width modulated signal having a second duty cycle greater than said first duty cycle to said motor; and applying a third pulse width modulated signal having a third duty cycle greater than said second duty cycle to said motor in response to the pressure in the accumulator decreasing to a second predetermined pressure.

8. A method as recited in claim 7 further comprising the step of monitoring the pressure in the accumulator;

applying a fourth pulse width modulated signal having a fourth duty cycle greater than said third duty cycle to said motor in response to the pressure in the accumulator decreasing to a third predetermined pressure.

9. A method as recited in claim 7 further comprising the step of monitoring the pressure in the accumulator; applying a highest level pulse width modulated signal having a highest duty cycle greater than said second duty cycle to said motor in response to a critical limit pressure in the accumulator.

10. A method as recited in claim 7 further comprising the step of shutting down the system if the pressure in the accumulator is below a critical limit.

11. A method as recited in claim 7 further comprising the step of setting a system flag if the pressure in the accumulator is below a critical limit.

12. An apparatus for reducing motor noise in a motor driven system comprising:

a sensor coupled to the system generating an electrical signal indicative of a system parameter; and a controller coupled to said motor and said sensor, said controller driving said motor with a pulse width modulated signal having a variable duty cycle, monitoring said electrical signal and varying the pulse width modulated signal from a primary duty cycle corresponding to a low noise operation to a higher duty cycle in response to an increased demand as indicated by said sensor, said controller applying a third pulse width modulated signal having a third duty cycle greater than said second duty cycle to said motor in response to the system parameter decreasing to a second predetermined parameter.

13. An apparatus as recited in claim 12 further comprising a pump coupled to said motor and an accumulator.

14. An apparatus as recited in claim 12 wherein when said system parameter decreases to a first predetermined parameter, said controller applies a second pulse width modulated signal having a second duty cycle greater than said primary duty cycle to said motor.

15. An apparatus as recited in claim 14 wherein said controller applies a third pulse width modulated signal having a third duty cycle greater than said second duty cycle to said motor in response the system parameter decreasing to a second predetermined parameter.

16. An apparatus as recited in claim 15 wherein said controller applies a fourth pulse width modulated signal having a fourth duty cycle greater than said third duty cycle to said motor in response to the system parameter decreasing to a third predetermined parameter.

17. An apparatus for reducing motor noise in a motor driven system comprising:

a pressure sensor coupled to the system generating an electrical signal indicative of a system pressure; and a controller coupled to said motor and said sensor, said controller driving said motor with a pulse width modulated signal having a variable duty cycle, monitoring said electrical signal and varying the pulse width modulated signal from a primary duty cycle corresponding to a low noise operation to a higher duty cycle in response to an increased demand as indicated by said sensor, wherein said controller increases said duty cycle as the system pressure decreases.

* * * * *